Aug. 25, 1925.
H. W. MELLING
LATHE
Filed Nov. 8, 1924
1,550,914
5 Sheets-Sheet 2
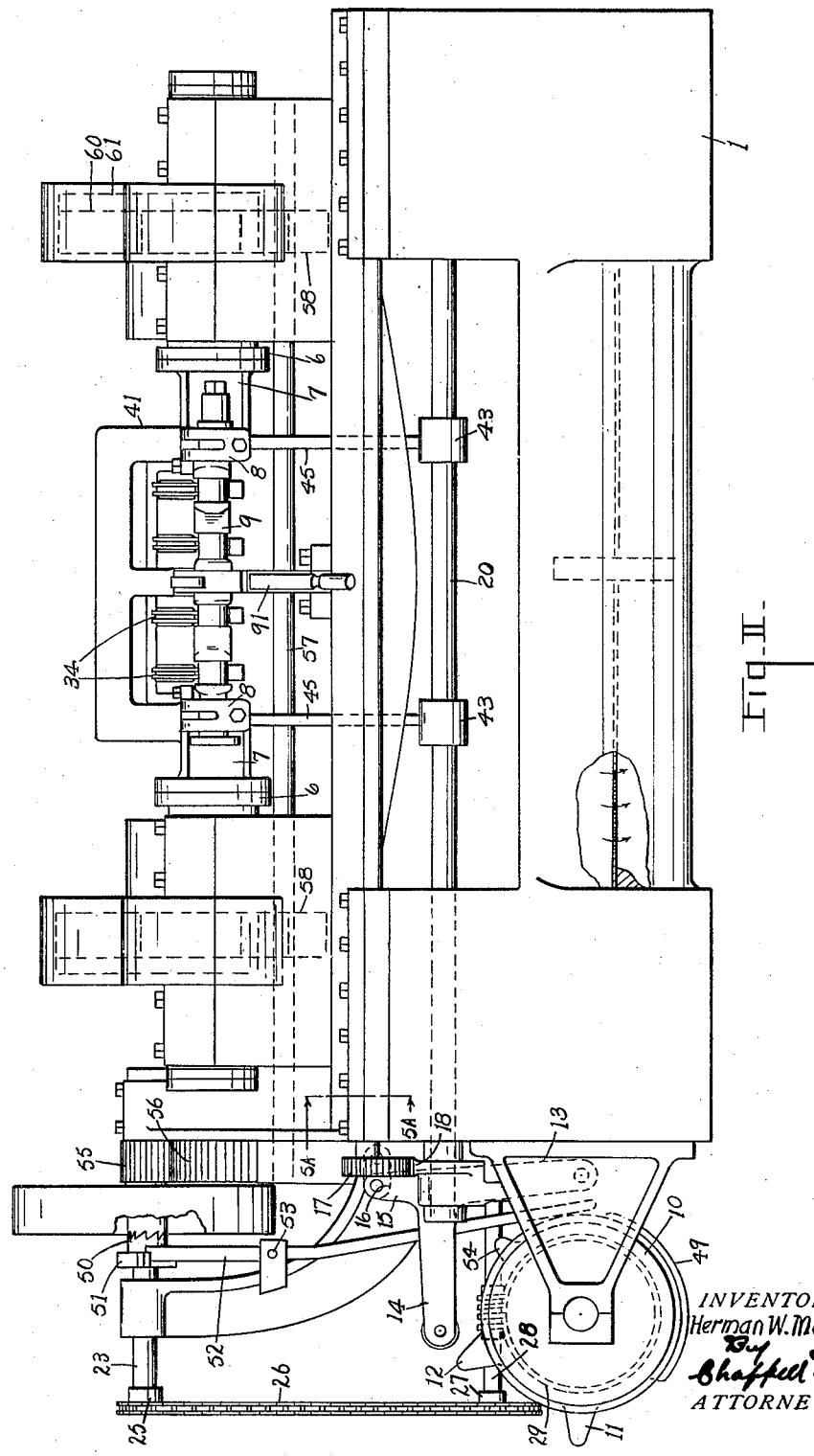

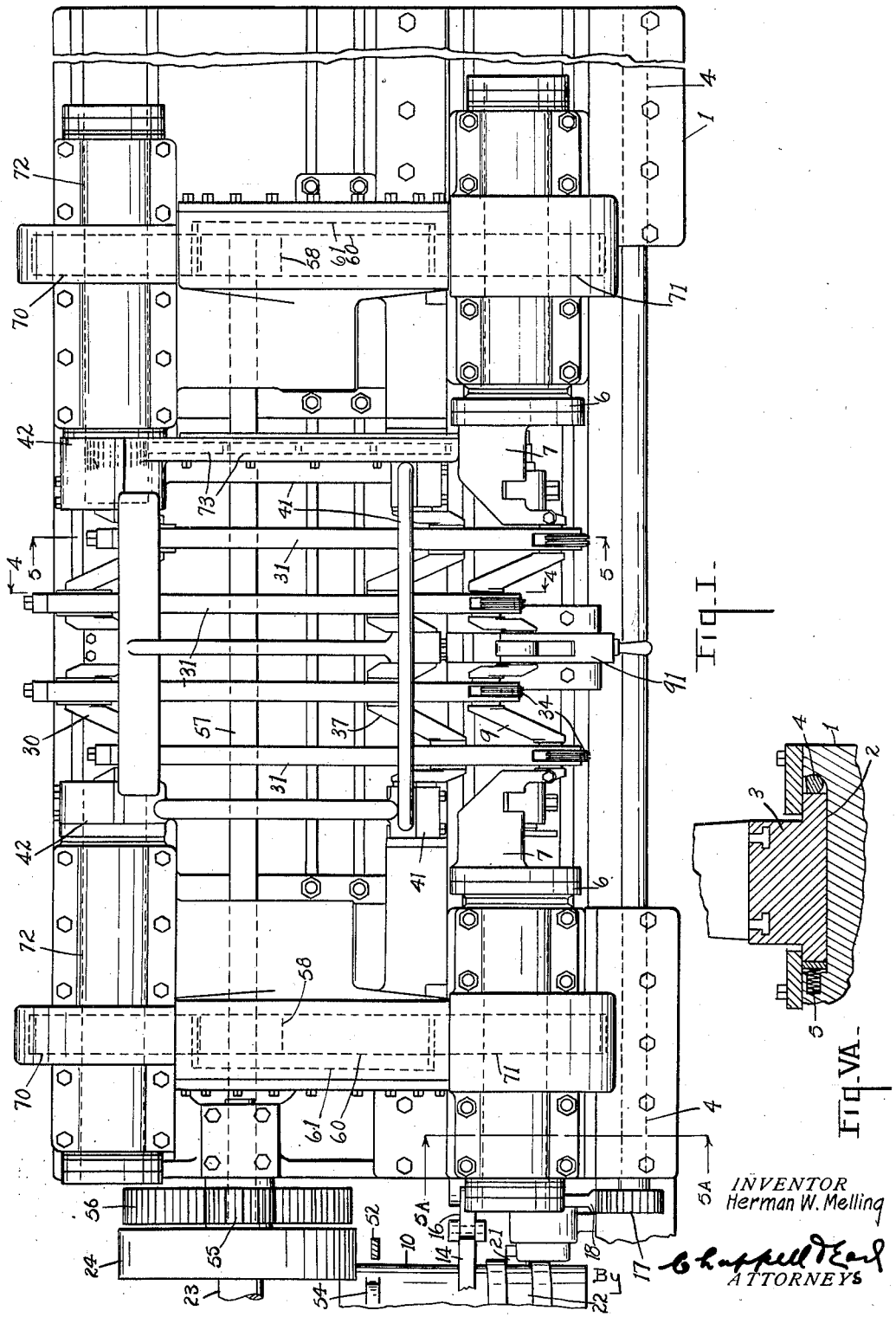

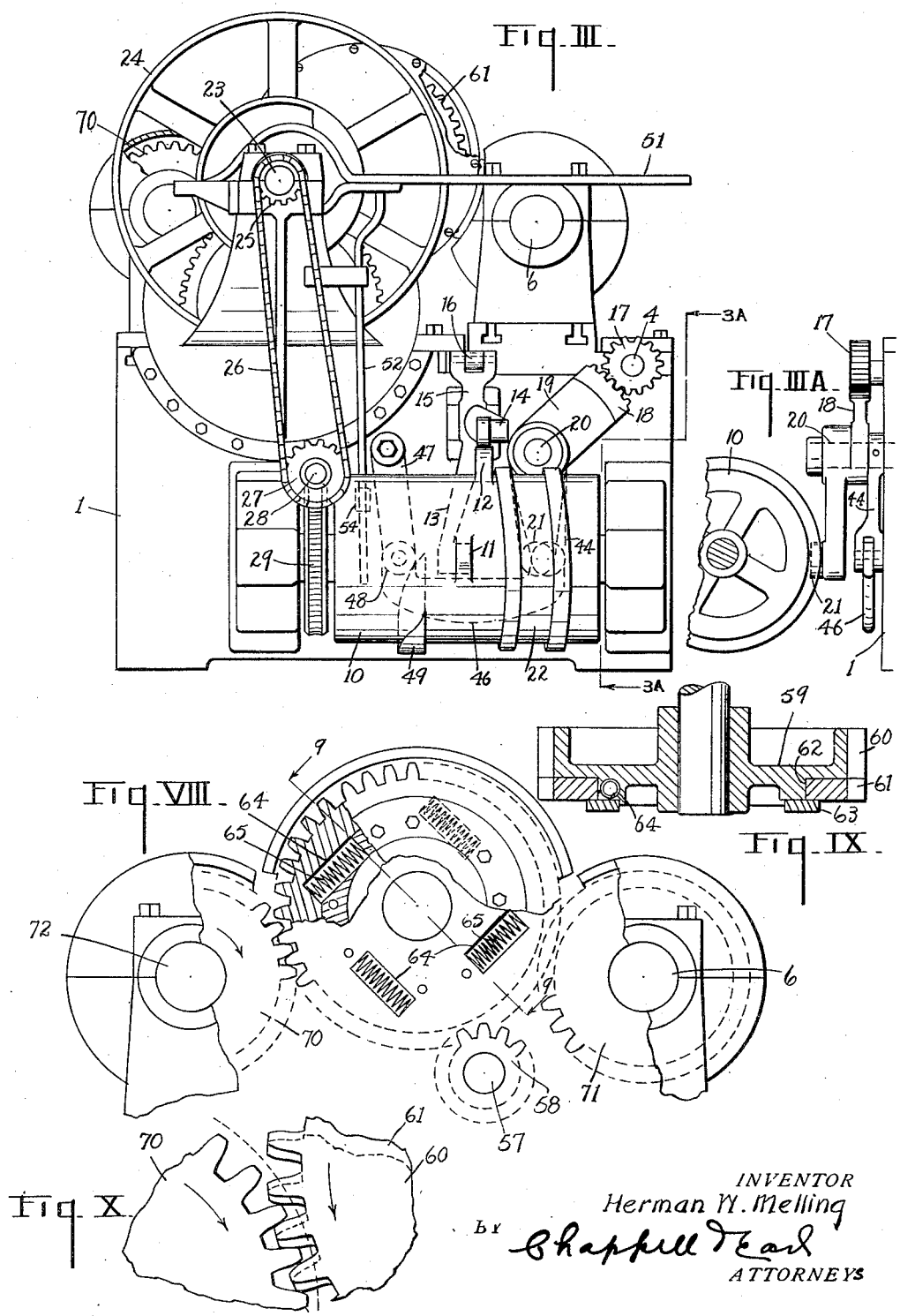

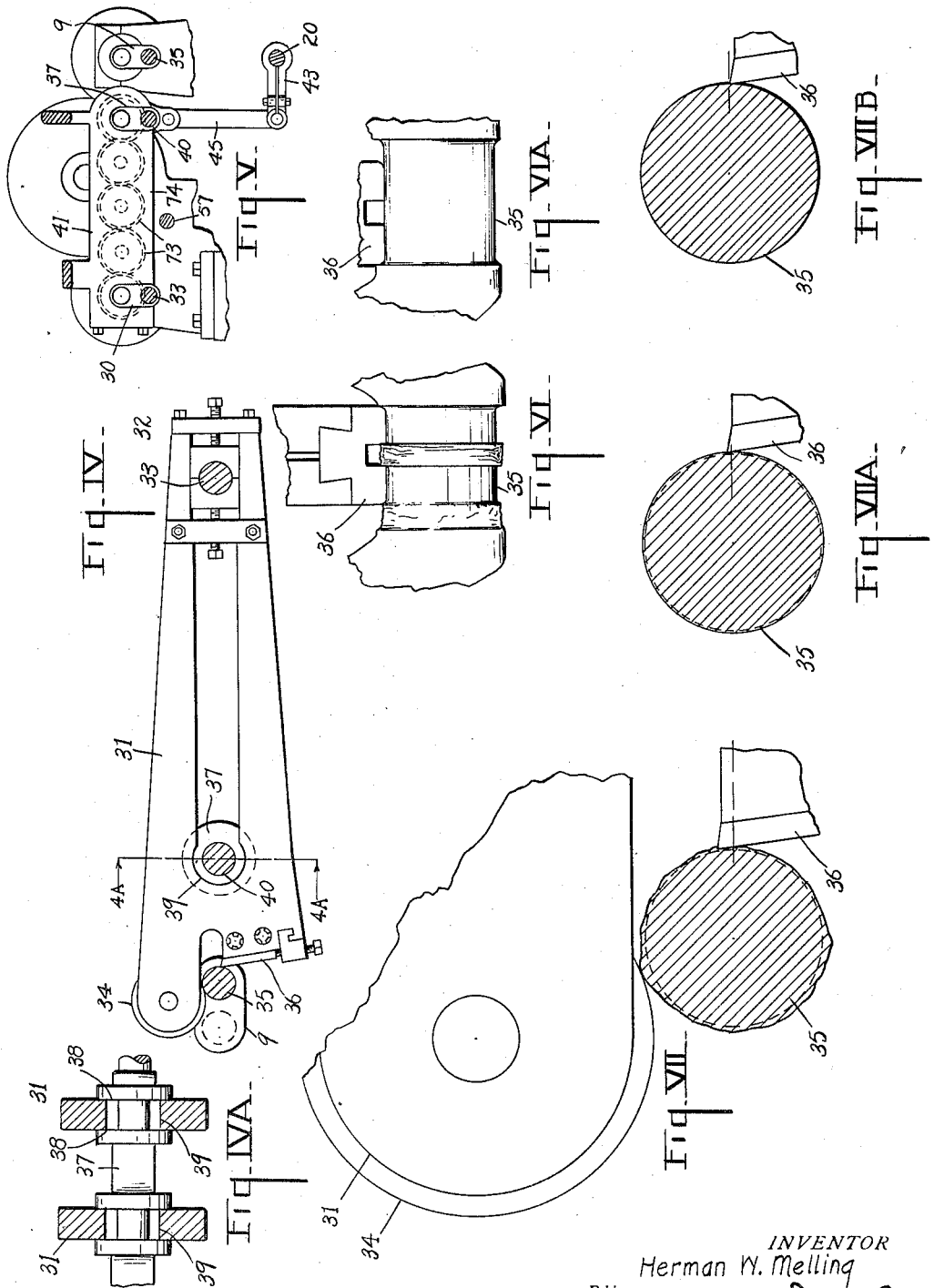

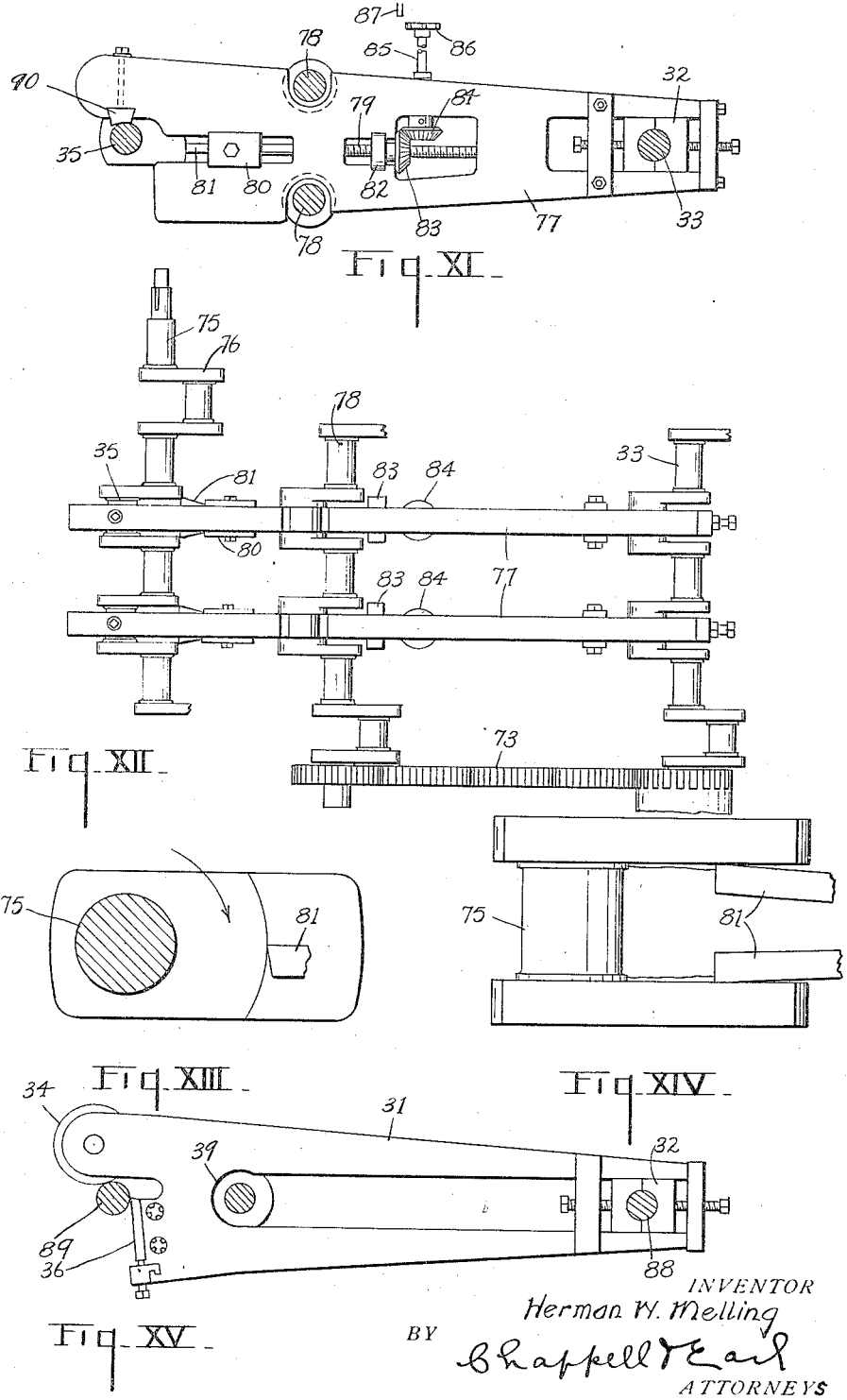

Patented Aug. 25, 1925.

1,550,914

UNITED STATES PATENT OFFICE.

HERMAN W. MELLING, OF JACKSON, MICHIGAN.

LATHE.

Application filed November 8, 1924. Serial No. 748,655.

*To all whom it may concern:*

Be it known that I, HERMAN W. MELLING, a citizen of the United States, residing at Jackson, county of Jackson, State of Michigan, have invented certain new and useful Improvements in Lathes, of which the following is a specification.

This invention relates to improvements in lathes.

In the accompanying drawings I have illustrated my improvements as embodied in a lathe for machining crank shafts, although my improvements are desirable and readily adapted for lathes for machining other kinds of work.

The main objects of this invention are:

First, to provide an improved lathe in which the parts are so arranged that the stresses upon the work and machine are relatively slight.

Second, to provide an improved lathe which is adapted for machining crank shafts such as the crank shafts of internal combustion engines which is of very large capacity.

Third, to provide an improved lathe for machining crank shafts which is very accurate, the work being a replica of the master crank shaft.

Fourth, to provide an improved lathe of the class described which requires but little finish grinding.

Objects pertaining to details and economies of construction and operation of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a plan view of a lathe embodying the features of my invention adapted for the machining of crank shafts.

Fig. II is a front elevation, portions being broken away to show structural details.

Fig. III is an end elevation looking from the left of Figs. I and II.

Fig. III<sup>A</sup> is a fragmentary view of the table control means partially in section on a line corresponding to line 3<sup>A</sup>—3<sup>A</sup> of Fig. III.

Fig. IV is a transverse vertical section on a line corresponding to line 4—4 of Fig. I showing one of the tool holders and its relation to the work.

Fig. IV<sup>A</sup> is a detail vertical section on a line corresponding to line 4<sup>A</sup>—4<sup>A</sup> of Fig. IV.

Fig. V is a detail view partially in vertical section on a line corresponding to line 5—5 of Fig. I showing details of the adjusting and driving means, the tool holder and tool being omitted.

Fig. V<sup>A</sup> is a detail section on a line corresponding to line 5<sup>A</sup>—5<sup>A</sup> of Fig. I showing details of the work table.

Fig. VI is an enlarged fragmentary view of one of the cutters in the position of initial cut.

Fig. VI<sup>A</sup> is a corresponding view with the cutter in another position.

Figs. VII, VII<sup>A</sup> and VII<sup>B</sup> are fragmentary views showing the relation of the work holder and cutter to the work as the machining progresses, Fig. VII indicating the work in the rough.

Fig. VIII is a fragmentary view of the driving connections for the master crank shaft and the work.

Fig. IX is a detail section on a line corresponding to line 9—9 of Fig. VIII.

Fig. X is an enlarged view of the coacting driving gears of Fig. VIII.

Fig. XI is a detail section corresponding to that of Fig. IV.

Fig. XII is a fragmentary plan view of the embodiment of my invention shown in Fig. XI.

Fig. XIII is a fragmentary view showing the relation of the cutter to the work as the work progresses.

Fig. XIV is a fragmentary plan view showing the relations of the cutters to the work as the cutting progresses.

Fig. XV is a detail sectional view corresponding to that of Fig. IV of a modified form of my invention adapted for machining other forms of circular work.

In the drawing the sectional views are taken looking in the direction of the little arrows at the ends of the section lines and similar numerals of reference indicate similar parts in all of the views.

Referring to the drawing, the base 1 of the machine is of suitable structure to support the operating parts. This base 1 is provided with a way 2 for the work carriage 3. The work carriage 3 is mounted for longitudinal feeding movement and for lateral movement on the way 2 to gauge the depth of cut and to provide for taking a roughing cut and a finishing cut. This is substantially as shown in my application for Letters Patent filed February 27, 1923, Serial No. 621,502, in which a supporting cam 4 is provided for supporting the table in its lateral or cut adjusting positions, springs 5 being provided to hold the table in its retracted position or against the cam.

The carriage carries a pair of live or driven spindles 6 having a pair of work chucks 7 provided with clamps 8 adapted to support the work 9, the embodiment of my invention illustrated being especially designed for the machining of crank shafts for internal combustion engines. The center bearing of the work is supported by the steady rest 91 which is preferably that shown in my Letters Patent No. 1,485,688 dated Mar. 4, 1924.

The carriage in my present embodiment is fed with an intermittent movement as distinguished from a continuous feed, the purpose being to enable one cut being taken as shown in Fig. VI, and the work carriage advanced one step to take a second cut as indicated in Fig VI^A. The length of the average crank pin is such that it would necessitate the making of the machines and cutters unduly heavy to perform the work at a single cut.

In the embodiment illustrated the feed of the carriage is controlled by the cam member 10 having cam projections 11 and 12 thereon adapted to alternately engage the arms 13 and 14, respectively, of the carriage feed lever 15 which is pivoted on the base of the machine and connected to the carriage by a link 16 so that the carriage is shifted or fed with an intermittent movement. The carriage is shifted laterally for the roughing and finishing cut by means of the cam shaft 4 as stated, this shaft being provided with a pinion 17 driven by the segment 18 of one arm of a lever 19 pivoted at 20 and having a roller 21 traveling in the cam groove 22 on the cam member 10 so that the lateral shift of the carriage is automatically checked and is timed relative to the feed movement thereof.

The drum or cam member 10 is driven from the main driving shaft 23 having a driving pulley 24 thereon. On the outer end of this shaft is a sprocket 25 connected by the sprocket chain 26 to a sprocket 27 on the worm shaft 28. This worm shaft coacts with a worm gear 29 on the shaft of the cam member 10.

At the rear of the machine I mount a pattern crank shaft 30 which in the embodiment illustrated is a replica of the work, that is, the throws of this pattern crank shaft are replicas in that they are of the same length and have the same relative position in the crank shaft as corresponding throws of the work. The crank pins are all machined simultaneously, there being a tool holder 31 for each crank pin. These tool holders are relatively long, the holder in the machine as I have embodied my improvements for the machining of crank pins being about thirty inches long.

These tool holders have bearings 32 coacting with the crank pins 33 of the pattern or tool holder controlling crank. At their forward ends the tool holders are provided with rollers 34 which rest upon the crank pins 35 of the work. The cutters 36 are mounted upon the tool holders to engage the work in an opposed relation to the point at which the rollers 34 engage or rest upon the work.

To support the tool holders 31 laterally and to provide means for lifting them from the work, I provide a supporting crank shaft 37 which also has throws arranged in the same relation and of the same length as the throws of the work.

This supporting crank shaft 37 has opposed thrust bearings 38 engaging the sides of the tool holders 31 as shown in Figs. IV and IV^A, thereby laterally supporting the tool holders adjacent the work. The tool holders have holes 39 therein for the crank pins 40 of the supporting crank 37, the holes and pins being of such relative diameter, as shown in Fig. IV, as to permit a vertical floating movement of the tool holders independently of the supporting shaft 37.

This supporting shaft 37 is carried by a frame designated generally by the numeral 41 and having bearings at its forward end for the supporting shaft 37. This frame 41 is pivotally supported at 42, the pivot axis of the frame coinciding with the axis of the master crank 30.

When this frame 41 is in its lowered or operative position, it permits the rollers 34 of all of the tool holders to rest upon the work. However, when the frame is raised or elevated, the tool holders are supported in inoperative position to permit the removal and insertion of the work.

In the embodiment illustrated the frame is automatically actuated from the cam member 10, the operating connections consisting of the arms 43 on the rock shaft 20. This rock shaft is connected to the frame by the links 45. On the outer end of this rock shaft 20 is an arm 44 having the link 46 secured to the lower end thereof, this link being supported at one end by the pivoted arm 47 carrying the roller 48 which is positioned to be acted upon by the cam 49 on the cam member 10, so that at the proper time in the cycle of operation the frame 41 is lifted to inoperative position, thereby elevating or disengaging the tool holders, the frame being automatically lowered.

The master or pattern crank, the supporting crank and the work are all driven in synchronism, and are, in the embodiment illustrated, driven from both ends. The driving pulley 24 is connected to the driving shaft 23 by means of the clutch 50 controlled by the lever 51 which is manually shifted to engage the clutch, but which is automatically actuated to release the clutch. This release is effected by means of the trip lever 52 which is pivoted at 53 and projects downwardly at the side of the cam member 10 to be engaged by the tappet cam 54 on the cam member.

When the cycle of operation is completed the trip lever 52 is engaged by the tappet cam 54 thereby stopping the machine so that all the manual operations that are required are to remove the work, insert a new piece and then engage the carriage by means of the lever 51. This lever 51 is mounted so that it may be lifted over the upper end of the releasing lever 52. As soon as the machine is started the lever 52 drops from the cam 54 allowing the lever 52 to swing back to engagement with the lever 51.

The shaft 23 has a gear 55 thereon meshing with a gear 56 on the shaft 57 which extends longitudinally of the machine below the tool holders. This shaft is provided with pinions 58 which are in mesh with the gears 59 made up of yieldingly connected sections 60 and 61, the purpose of which will appear as the description proceeds.

These sections 60 and 61 have the same number of teeth, the section 61 being mounted for limited rotative movement on the shoulder 62 of the section 61, being retained thereon by the link 63, see Figs. VIII, IX and X. These gear sections have registering recesses therein providing pockets 64 for the springs 65, the springs at one end engaging the gear member 60 and at the other end engaging the gear member 61, so that the gear member 61 is yieldingly supported by these springs.

The gears 59 mesh with gears 70 and 71. The gears 71 are on the live spindles or shafts 6 on the work carriage. The gears 70 are on the shafts 72 on which the master crank is mounted. I have pointed out that the carriage 3 is supported for lateral adjustment to determine the depth of cut, or to provide for a roughing and a finishing cut. This lateral movement of the carriage would vary the position of the gears 70 relative to the gears 59, and it is to compensate for such variation, or prevent back lash or lost motion between the pattern crank and the work, that I provide the sectional gears 59, the springs 64 keeping the gears 70 from rotating ahead as the gears are shifted laterally relative to each other, see Fig. X.

The work supporting crank is driven in synchronism with the master crank and the work, and to this end I provide a train of gears designated generally by the numeral 73 by means of which the supporting crank is connected to the master crank. This train of gears is disposed in a housing 74 carried by the frame 41. With the parts thus arranged the strain upon the work and on the machine generally is relatively slight. The stresses are, as I have pointed out, in an opposed relation to the tool holder supporting roller 34 which travels upon the work, and the stresses are largely counteracted in the work instead of being delivered to the work in a manner which would tend to spring it, or to the tool holder in a manner which would put undue stresses upon the tool holder and frame.

In the embodiment shown in Figs. I to X, inclusive, I have illustrated my improvements as I have embodied them in a machine for the machining of crank pins of engine crank shafts.

In the embodiment shown in Figs. XI to XIV, inclusive, I illustrate an adaptation of my improvements to a machine for machining the cheek pieces of crank shafts. In Fig. XII the work is indicated at 75 having cheek pieces 76. The tool holders 77 of this embodiment are mounted upon the pattern crank the same as has been described. A pair of supporting crank shafts 78 is provided in order that the feed screw 79 of the tool block 80 may be disposed longitudinally and centrally of the tool holder.

This tool block 80 carries a pair of tools 81 adapted to act upon opposing faces of the cheek pieces simultaneously. The tool block is fed forwardly by means of the feed nut 82 having a beveled gear 83 thereon with which the gear 84 on the driving shaft 85 meshes. This driving shaft has a star wheel 86 thereon adapted to engage the tappet 87 on each stroke of the tool holder, thereby gradually advancing the cutters to the work.

I have not attempted to illustrate or describe other forms of tool feeding means which I contemplate as I believe that this disclosure will enable those skilled in the art to embody my improvements as desired.

In Fig. XV I illustrate my improvements as embodied in a machine for machining circular objects. In that case the tool holder is mounted on the fixed shaft 88, the work being indicated at 89. Otherwise, the parts are substantially the same as in Fig. IV.

In the embodiments shown in Fig. XI to XV, inclusive, the roller 34 is omitted and bearing shoes 90 resting upon the work are provided. The rollers, however, are preferred for most classes of work as friction is reduced. These rollers are preferably peripherally grooved as shown in Fig. I.

I have illustrated and described my improvements in embodiments or adaptations which I have found very practical. I have not attempted to illustrate or describe certain other modifications or adaptations as I believe the disclosure made will enable those skilled in the art to embody or adapt my improvements as may be desired.

Having thus described my invention, what I claim as new and desire to secure by Letters Patent is:

1. In a machine of the class described, the combination of a work carriage mounted for step by step feed travel and for cut adjustment laterally of the plane of its feed travel, feed means for said work carriage, means for laterally adjusting said work carriage, work supporting and driving means on said work carriage, a master crank having throws which are replicas of the throws of the work, relatively long tool holders pivotally mounted on the pins of said master crank and overhanging corresponding throws of the work, said tool holders being provided with supporting rollers resting upon the pins of the work, cutters mounted on said tool holders to coact with the work in opposed relation to said supporting rollers, a pivoted tool holder supporting frame, the pivot axis of said frame coinciding with the axis of said master crank, a tool holder supporting crank mounted on said supporting frame and having throws corresponding to the throws of the master crank and work and provided with bearings laterally supporting said tool holders adjacent the work, said tool holders being floatingly supported by said supporting crank when in cutting position, driving connections for said master crank, supporting crank and work whereby they are rotated in synchronism, means for automatically adjusting said tool holder supporting frame operatively associated with said work carriage feed and adjusting means whereby the operation thereof is timed, and means for automatically stopping the machine with said supporting frame in elevated position.

2. In a machine of the class described, the combination of a work supporting and driving means, a master crank having throws which are replicas of the throws of the work, relatively long tool holders pivotally mounted on the pins of said master crank and overhanging corresponding throws of the work, said tool holders being provided with supporting rollers resting upon the pins of the work, cutters mounted on said tool holders to coact with the work in opposed relation to said supporting rollers, a pivoted tool holder supporting frame, the pivot axis of said frame coinciding with the axis of said master crank, a tool holder supporting crank mounted on said supporting frame and having throws corresponding to the throws of the master crank and work and provided with bearings laterally supporting said tool holders adjacent the work, said tool holders being floatingly supported by said supporting crank when in cutting position, driving connections for said master crank, supporting crank and work whereby they are rotated in synchronism, means for automatically adjusting said tool holder supporting frame, and means for automatically stopping the machine with said supporting frame in elevated position.

3. In a machine of the class described, the combination of a work carriage mounted for step by step feed travel and for cut adjustment laterally of the plane of its feed travel, feed means for said work carriage, means for laterally adjusting said work carriage, work supporting and driving means on said work carriage, a master crank having throws which are replicas of the throws of the work, relatively long tool holders pivotally mounted on the pins of said master crank and overhanging corresponding throws of the work, said tool holders being provided with supporting rollers resting upon the pins of the work, cutters mounted on said tool holders to coact with the work in opposed relations to said supporting rollers, and driving connections for said master crank and work whereby they are rotated in synchronism.

4. In a machine of the class described, the combination of a work supporting and driving means, a master crank having throws which are replicas of the throws of the work, relatively long tool holders pivotally mounted on the pins of said master crank and overhanging corresponding throws of the work, said tool holders being provided with supporting rollers resting upon the pins of the work, cutters mounted on said tool holders to coact with the work in opposed relations to said supporting rollers, and driving connections for said master crank and work whereby they are rotated in synchronism.

5. In a machine of the class described, the combination of a work carriage mounted for step by step feed travel and for cut adjustment laterally of the plane of its feed travel, feed means for said work carriage, means for laterally adjusting said work carriage, work supporting and driving means on said work carriage, a master crank having throws which are replicas of the throws of the work, tool holders pivotally mounted on the pins of said master crank and resting upon corresponding pins of the work, being floatingly supported thereby, cutters mounted on said tool holders to coact with the work in opposed relations to points of engagement of the tool holders with the work, a pivoted tool holder supporting frame, the pivot axis of said frame coinciding with the axis of said master crank, a tool holder supporting crank mounted on said supporting frame and having throws corresponding to the throws of the master crank and work and provided with bearings laterally supporting said tool holders adjacent the work, said tool holders being floatingly supported by said supporting crank when in cutting position, driving means for said master crank, supporting crank and work whereby they are rotated in synchronism, means for automatically adjusting said tool holder supporting frame operatively associated with said work carriage feed and adjusting means whereby the operation thereof is timed, and means for automatically stopping the machine with said supporting frame in elevated position.

6. In a machine of the class described, the combination of work supporting and driving means, a master crank having throws which are replicas of the throws of the work, tool holders pivotally mounted on the pins of said master crank and resting upon corresponding pins of the work, being floatingly supported thereby, cutters mounted on said tool holders to coact with the work in opposed relations to points of engagement of the tool holders with the work, a pivoted tool holder supporting frame, the pivot axis of said frame coinciding with the axis of said master crank, a tool holder supporting crank mounted on said supporting frame and having throws corresponding to the throws of the master crank and work and provided with bearings laterally supporting said tool holders adjacent the work, said tool holders being floatingly supported by said supporting crank when in cutting position, driving means for said master crank, supporting crank and work whereby they are rotated in synchronism, means for automatically adjusting said tool holder supporting frame operatively associated with said work carriage feed and adjusting means whereby the operation thereof is timed, and means for automatically stopping the machine with said supporting frame in elevated position.

7. In a machine of the class described, the combination of a work carriage mounted for step by step feed travel and for cut adjustment laterally of the plane of its feed travel, feed means for said work carriage, means for laterally adjusting said work carriage, work supporting and driving means on said work carriage, a master crank having throws which are replicas of the throws of the work, tool holders pivotally mounted on the pins of said master crank and resting upon corresponding pins of the work, being floatingly supported thereby, cutters mounted on said tool holders to coact with the work in opposed relations to points of engagement of the tool holders with the work, and driving connections for said master crank and work whereby they are rotated in synchronism.

8. In a machine of the class described, the combination of work supporting and driving means, a master crank having throws which are replicas of the throws of the work, tool holders pivotally mounted on the pins of said master crank and resting upon corresponding pins of the work, being floatingly supported thereby, cutters mounted on said tool holders to coact with the work in opposed relations to points of engagement of the tool holders with the work, and driving connections for said master crank and work whereby they are rotated in synchronism.

9. In a lathe, the combination of a work carriage, driving means therefor, a master crank having throws which are replicas of the throws of the work, tool holders pivotally mounted on the pins of said master crank and resting at their other ends upon the pins of the work, cutters mounted on said tool holders, means for driving said master crank and work in synchronism, means for simultaneously lifting the several tool holders to inoperative position, and operating connections for said work carriage driving means and said tool holder lifting means whereby the actuation thereof is timed.

10. In a lathe, the combination of a work carriage, driving means therefor, a master crank having throws which are replicas of the throws of the work, tool holders pivotally mounted on the pins of said master crank, said tool holders having thrust members at their other ends resting upon the pins of the work, cutters mounted on said tool holders, and means for driving said master crank and work in synchronism.

11. In a lathe, the combination of means for rotatably supporting the work, a master crank having a throw which is a replica of the throw of the work, a tool holder pivotally mounted on the pin of said master crank and resting at its other end upon the pin of the work, a cutter mounted on said tool holder, means for driving said master crank and work in synchronism, means for lifting the tool holder to inoperative position, and operating connections for said work carriage driving means and said tool holder lifting means whereby the actuation thereof is timed.

12. In a lathe, the combination of means for rotatably supporting the work, a master crank having a throw which is a replica of the throw of the work, a tool holder pivotally mounted on the pin of said master crank and resting at its other end upon the pin of the work, a cutter mounted on said tool holder in an opposed relation to and facing the point of engagement of the tool holder with the work, and means for driving said master crank and work in synchronism.

13. In a machine for turning the crank pins of crank shafts, the combination of means for rotatably supporting and driving the work, a master crank having throws which are replicas of the throws of the work, tool holders pivotally mounted on the pins of said master crank and supported by corresponding pins of the work, said tool holders being provided with supporting rollers resting upon the pins of the work, and cutters mounted on said tool holders, said master crank and work being driven in synchronism.

14. In a machine for turning the crank pins of crank shafts, the combination of means for rotatably supporting and driving the work, a master crank having throws which are replicas of the throws of the work, tool holders pivotally mounted on the pins of said master crank and floatingly supported by corresponding pins of the work, and cutters mounted on said tool holders the cutters being disposed in an opposed relation to the points of engagement of the tool holders with the work, said master crank and work being driven in synchronism.

15. In a machine of the class described, the combination of means for rotatably supporting and driving the work, a driven master shaft which is a replica of the work, a tool holder pivotally mounted on said master shaft to rest upon the work and floatingly supported thereby, a cutter mounted on said tool holder in opposed relation to the point of engagement of the tool holder with the work, and means for rotating said master shaft and work in synchronism.

16. In a machine of the class described, the combination of means for rotatably supporting and driving the work, a driven master shaft which is a replica of the work, a tool holder pivotally mounted on said master shaft to rest upon the work and floatingly supported thereby, a cutter mounted on said tool holder, and means for rotating said master shaft and work in synchronism.

17. In a lathe, the combination of work supporting and driving means, a relatively long tool holder pivoted at its outer end and resting upon and floatingly supported by the work, said tool holder being provided with a peripherally grooved supporting roller traveling upon the work, and a cutter mounted on said tool holder to engage the work in an opposed relation to the point of engagement of the tool holder roller therewith.

18. In a lathe, the combination of work supporting and driving means, a relatively long tool holder pivoted at its outer end and resting upon and floatingly supported by the work, and a cutter mounted on said tool holder to engage the work in an opposed relation to the point of engagement of the tool holder therewith.

19. In a structure of the class described, the combination of a work carriage mounted for feed travel and for cut adjustment laterally of the plane of its feed travel, feed means for said work carriage, means for laterally adjusting said work carriage, work supporting and driving means on said work carriage, a tool holder, means for automatically lifting said tool holder from the work operatively associated with said work carriage feed means and adjusting means whereby the operation thereof with said carriage feed and adjusting means is timed, and means for automatically stopping the machine with said tool holder in its inoperative position.

20. In a structure of the class described, the combination of a work carriage mounted for feed travel and for cut adjustment laterally of the plane of its feed travel, feed means for said work carriage, means for laterally adjusting said work carriage, work supporting and driving means on said work carriage, a tool holder, and means for automatically lifting said tool holder from the work operatively associated with said work carriage feed means and adjusting means whereby the operation thereof with said carriage feed and adjusting means is timed.

21. In a structure of the class described, the combination of a work carriage, actuating means for said work carriage, work supporting and driving means on said work carriage, a tool holder, means for automatically lifting said tool holder from the work operatively associated with said work carriage actuating means whereby the operation thereof is timed, and means for automatically stopping the machine with said tool holder in its inoperative position.

22. In a structure of the class described, the combination of a work carriage, actuating means for said work carriage, work supporting and driving means on said work carriage, a tool holder, and means for automatically lifting said tool holder from the work operatively associated with said work carriage actuating means whereby the operation thereof is timed, 23. In a machine of the class described, the combination of a work carriage mounted for feed travel and for cut adjustment laterally of the plane of its feed travel, automatically acting means for driving said carriage and laterally adjusting the same, work supporting and driving means on said work carriage including a driving shaft, a master shaft mounted in a fixed relation relative to the carriage, driving means for said master shaft including a driven shaft, a tool holder pivotally mounted on said master shaft and resting upon a corresponding part of the work, a cutter mounted on said tool holder, gears on said driven shafts, a coacting gear meshing with both such gears and comprising a driving member, a supplementary gear member mounted on said driving member for limited rotative movement and having teeth corresponding to the teeth of the driving member and meshing with said pair of gears, and springs for yieldingly supporting said supplementary gear member upon said driving gear member.

24. In a machine of the class described, the combination of a work carriage, work supporting and driving means on said work carriage including a driving shaft, a master shaft mounted in a fixed relation relative to the carriage, driving means for said master shaft including a driven shaft, a tool holder pivotally mounted on said master shaft and resting upon a corresponding part of the work, a cutter mounted on said tool holder, gears on said driven shafts, a coacting gear meshing with both such gears and comprising a driving member, a supplementary gear member mounted on said driving member for limited rotative movement and having teeth corresponding to the teeth of the driving member and meshing with said pair of gears, and springs for yieldingly supporting said supplementary gear member upon the driving gear member.

25. In a machine of the class described, the combination of a work carriage mounted for feed travel and for cut adjustment laterally of the plane of its feed travel, automatically acting means for driving said carriage and laterally adjusting the same, work supporting and driving means on said work carriage including a driving shaft, a gear on said driven shaft, a coacting gear meshing therewith and comprising a driving gear, a supplementary gear member mounted on said driving gear member for limited rotative movement and having teeth corresponding to the teeth of the driving member and meshing with said gear on said driven shaft, and a spring means for yieldingly supporting said supplementary gear member upon said driving gear member.

In witness whereof I have hereunto set my hand.

HERMAN W. MELLING.